US008651787B2

(12) United States Patent
Levey et al.

(10) Patent No.: US 8,651,787 B2
(45) Date of Patent: Feb. 18, 2014

(54) SPIRE INSERT WITH RING-SHANK NICKING

(75) Inventors: Kenneth R. Levey, Elgin, IL (US); Jason D. Holt, St. Charles, IL (US); Robert R. Schaser, St. Hampshire, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/635,974

(22) PCT Filed: Apr. 6, 2011

(86) PCT No.: PCT/US2011/031357
§ 371 (c)(1),
(2), (4) Date: Sep. 19, 2012

(87) PCT Pub. No.: WO2011/130073
PCT Pub. Date: Oct. 20, 2011

(65) Prior Publication Data
US 2013/0017032 A1    Jan. 17, 2013

Related U.S. Application Data

(60) Provisional application No. 61/324,896, filed on Apr. 16, 2010.

(51) Int. Cl.
F16B 37/04    (2006.01)

(52) U.S. Cl.
USPC .......................... 411/180; 411/172; 411/178

(58) Field of Classification Search
USPC ......... 411/103, 172, 174–175, 176–177, 178, 411/180, 187–188, 383, 411, 417, 432, 411/436–437, 927; 16/2.4
See application file for complete search history.

(56) References Cited

U.S. PATENT DOCUMENTS

| | | | | |
|---|---|---|---|---|
| D157,484 S | * | 2/1950 | Gade | D8/397 |
| 2,949,142 A | * | 8/1960 | Sumerak | 411/180 |
| 3,081,808 A | * | 3/1963 | Rosan et al. | 411/178 |
| 3,362,281 A | * | 1/1968 | Finlay | 411/395 |
| 3,405,591 A | * | 10/1968 | Neuschotz | 411/416 |
| 3,530,921 A | * | 9/1970 | Ernest | 411/259 |
| 4,046,181 A | * | 9/1977 | Barnsdale | 411/180 |
| D262,863 S | * | 2/1982 | Barnsdale | D8/385 |
| 4,712,955 A | * | 12/1987 | Reece et al. | 411/17 |
| 5,085,547 A | * | 2/1992 | Vanotti | 411/72 |

(Continued)

FOREIGN PATENT DOCUMENTS

DE    1978882 U    2/1968

OTHER PUBLICATIONS

An International Search Report and Written Opinion, dated Jun. 28, 2011 in International Application No. PCT/US2011/031357.

*Primary Examiner* — Roberta Delisle
(74) *Attorney, Agent, or Firm* — Mark W. Croll; Paul F. Donovan

(57) ABSTRACT

An external surface for a fastener insert to be embedded in a component includes ridges extending along an outer surface of the portion to be embedded. The ridges include end-to-end projections that vary in width and height from one end of a projection to an opposite end of a projection. Wedges are formed in the surface between adjacent ridges.

18 Claims, 2 Drawing Sheets

(56) References Cited

U.S. PATENT DOCUMENTS

| | | | |
|---|---|---|---|
| 5,131,795 A * | 7/1992 | Kobusch | 411/178 |
| 5,391,031 A * | 2/1995 | Medal | 411/82.5 |
| 5,634,752 A * | 6/1997 | Haage et al. | 411/82 |
| 5,697,744 A * | 12/1997 | Medal | 411/82 |
| 6,193,456 B1 * | 2/2001 | Stumpf et al. | 411/180 |
| 6,676,352 B2 * | 1/2004 | Chen-Chi et al. | 411/417 |
| 2002/0021948 A1 | 2/2002 | Stumpf et al. | |
| 2006/0093455 A1 | 5/2006 | Wieser et al. | |
| 2007/0009341 A1 * | 1/2007 | Nagayama | 411/432 |
| 2009/0080998 A1 * | 3/2009 | Nagayama | 411/432 |
| 2009/0155021 A1 | 6/2009 | Versino et al. | |

* cited by examiner

SPIRE INSERT WITH RING-SHANK NICKING

RELATED APPLICATIONS

The present application is based on International Application No. PCT/US2011/031357, filed Apr. 6, 2011 and claims priority from, U.S. Provisional Application No. 61/324,896, filed Apr. 16, 2010.

FIELD OF THE INVENTION

The present invention relates generally to fasteners and fastening systems, and, more particularly, to fastener components of fastening systems that are embedded in another part, often of dissimilar material.

BACKGROUND OF THE INVENTION

It is known to provide fastening systems that include threaded inserts of metal that are anchored in plastic or other components when used to receive a screw or bolt for holding a second component in an assembly. For example, plastic parts in automobiles, computers, appliances of different types, and various other assemblies are known to be provided with metal inserts having internal threads so that another part can be held thereto by a bolt or screw engaged with the insert. It is also known to anchor a threaded stud in a plastic or other part so that another component can be held there on by a nut threaded onto the threads of the stud.

Various techniques are known for securing the anchored component, such as a threaded insert or stud, in the plastic or other part. Simple threaded engagement can be used, with threads on the outer surface of the insert or stud threaded into the component in which it is held. In a process known as heat-staking, a metal part, such as a threaded female insert or stud, is heated and pushed into the plastic component in which it is held, melting and fusing the inter-facing plastic surface on to the embedded portion of the insert or stud. Heat-staking can be performed relatively inexpensively. Ultrasonic insertion is also known whereby the part is vibrated ultrasonically and pushed into the receiving component. Ultrasonic insertion can be performed relatively quickly, but the process tends to be expensive. In a more simple mechanical process, the component to be anchored is provided with a knurled or other configured outer surface and is simply pushed into the receiving component. Mechanical insertion such as this can be performed quickly, but the machining process required to form the outer surface of the insert adds significantly to overall cost. Further, mechanical insertion tends to channel or direct the material of the anchoring component, and it has been difficult to achieve significant holding strength against pullout with push-in inserts. Further, to facilitate easy and rapid machining of inserts, it has been known to use expensive materials, such as brass, for inserts installed by all such methods. Knurls, undercuts and other such formations can be formed readily in brass; however, the costs of parts made of such materials are high.

Advantages can be obtained from providing an insert that can be driven readily while providing significant resistance to both pullout and rotation in the completed assembly. Further advantages are realized if the insert can be manufactured easily from inexpensive materials using simple and efficient manufacturing processes.

SUMMARY OF THE INVENTION

An embeddable spire insert is disclosed herein with ring-shank nicking which can be manufactured efficiently and quickly by rolling processes utilizing dies and lesser expensive materials, such as steel. A plurality of ridges of outwardly extending projections is provided. The ridges may be axially oriented or helical or spiral type threads. The projections are formed as adjacently arranged bodies. Wedges are provided in the root areas between the ridges.

In one aspect of one form, an insert is provided with an embeddable body having an external surface, a plurality of spaced ridges projecting from and extending along the external surface, and a plurality of wedges disposed between adjacent ridges of the plurality of ridges.

In another aspect an insert is provided with an embeddable fastener body having an external surface, and a plurality of spaced ridges projecting from and extending along the external surface, adjacent ridges defining inter-ridge spaces therebetween. Each ridge includes a row of end-to-end projections, each projection having a narrower and shorter portion and a wider portion and taller portion. A series of wedges are arranged in each inter-ridge space.

In a further aspect, an external surface on a fastener insert is provided with a plurality of spaced ridges projecting from and extending along the shank of the insert at a ridge pitch such that individual ridges extend a given length of the shank without fully encircling the shank. Each ridge includes a row of end-to-end projections varying in width and height. A series of wedges projecting from the shank is provided between pairs of adjacent ridges.

Other features and advantages of the invention will become apparent to those skilled in the art upon review of the following detailed description, claims and drawings in which like numerals are used to designate like features.

Figure 1:
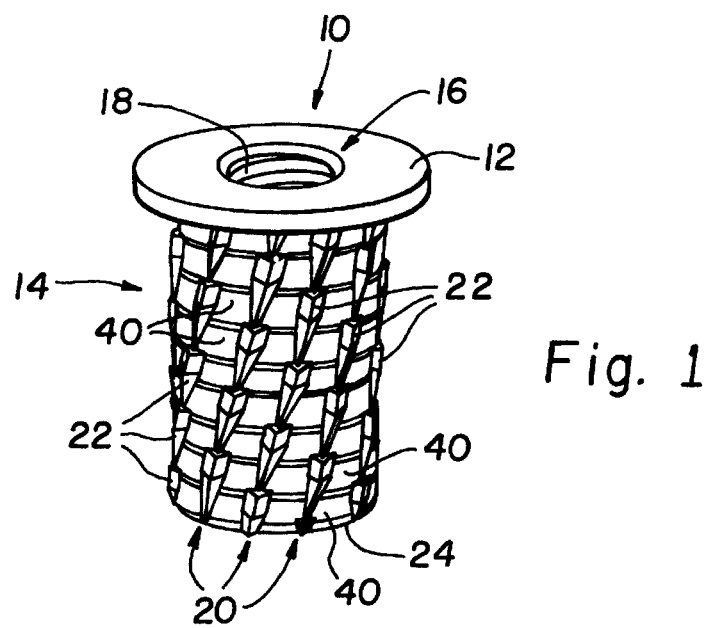
FIG. 1 is a perspective view of a female threaded insert with ring-shank nicking.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and particularly to FIG. 1, an embeddable insert 10 is shown. Insert 10 is a female threaded insert having a monolithic body of metal such as steel that includes a head 12 and a shank 14 defining an axial opening 16 therethrough which includes a female thread 18 therein.

The outer surface of shank 14 defines a plurality of ridges 20, each ridge 20 being a row of spire-like projections 22. Some, but not all projections 22 have been identified with reference numerals in the drawings. The ridges can be axially or longitudinally arranged, or can be helical or spiral to encourage a rotational movement of the insert as the insert is driven into a body of plastic or other material. In the exemplary embodiment shown, each ridge 20 extends angularly relative to the axial extent of shank 14, extending along a helical path on shank 14 at a given pitch which does not result in any ridge 20 completely encircling shank 14. Adjacent ridges 20 are somewhat distantly spaced defining relatively wide inter-ridge spaces there between. It should be understood however that ridges 20 can be more angularly or less angularly oriented than as shown and can be more closely or more distantly spaced from one another.

Projections 22 can be formed as generally triangular shaped teeth aligned one adjacent another in an end-to-end relationship, with each projection 22 inclining away from a distal or lead end 24 of the insert. Accordingly, each individual projection 22 forms a ramp-like structure facilitating mechanical insertion into a retaining body. The projections can take many different shapes, and, as shown in the exemplary embodiment, may be narrower at the tips or lead ends thereof and broader at the tails or trailing ends while also inclining from the tips to the tails, thus being shorter at the tip and taller at the tail. Each projection may also form a steep back to meet the tip of the next adjacent projection. Sides of the projections may be flat or contoured, and may be at angles with respect to one another to form a narrow outer ridge from tip to tail. The steep backs of the projections resist pull-out of the insert, and the sides of the projections provide resistance against rotation after the insert is in final position and seated in the retaining body. For example and not limitation, projections shaped as described for use on a nail in United States Patent Application Publication US 2009/0155021, which is incorporated in its entirety by reference, can be used, as well as projections of other shapes and configurations.

Figure 2:
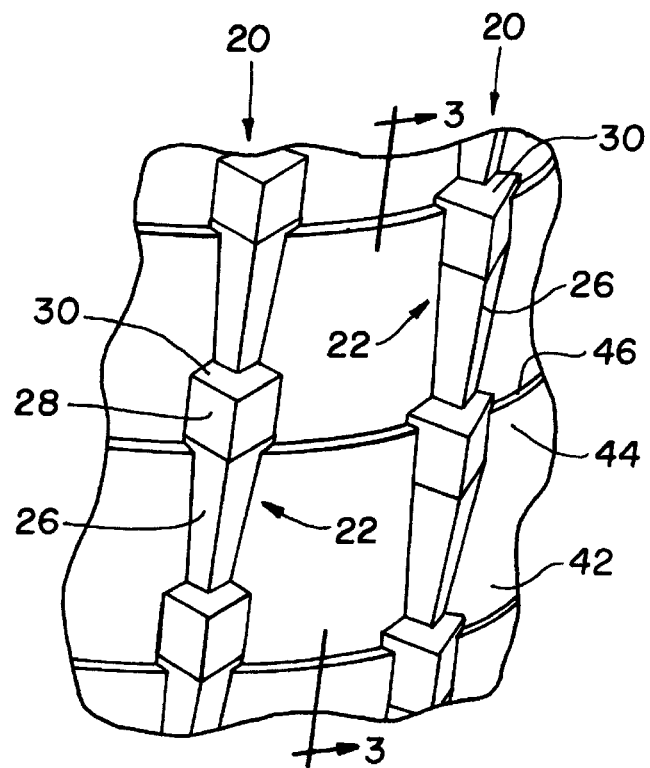
FIG. 2 is an enlarged, fragmentary perspective view of the outer surface of the insert shown in FIG. 1.
Figure 3:
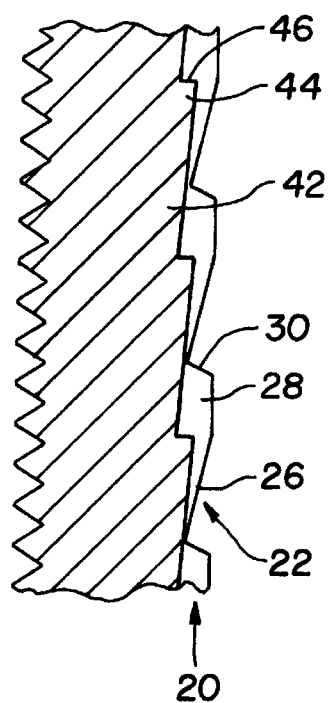
FIG. 3 is an enlarged, fragmentary, cross-sectional view of the insert.

In the exemplary embodiment as shown most clearly in FIG. 2, each projection 22 includes a two-sided tip portion 26 that is narrower at the lead end thereof and wider at the trailing end thereof while also being shorter at the lead end and taller at the trailing end while being also shorter at the lead end and taller at the trailing end. At the trailing end, an enlarged cap 28 is provided, having an exposed, blunt back 30. As further shown in the exemplary embodiment, within ridge 20, inwardly from the first projection 22 each tip portion 26 begins immediately adjacent and in contact with the back 30 of the projection immediately in front thereof toward lead end 24. This exemplary configuration is merely one suitable formation, and projections of other shapes, relative sizes and the like also can be used.

In the root or inter-ridge areas between adjacent ridges 20, the surface of the insert is provided with nicking, being formed into a contoured surface of adjacent wedges. Wedges 40 also incline from the tips or lead ends 42 thereof to the tails or trailing ends 44 thereof, the trailing ends 44 forming abrupt transitions or shoulders 46 to the next adjacent wedge 40. Accordingly, wedges 40 are lower at lead ends 42 and higher at trailing ends 44. In the exemplary embodiment, wedges 40 extend laterally the full distance between adjacent ridges 20. Some, but not all wedges 40 and some, but not all lead ends 42, trailing ends 44 and shoulders 46 have been identified with reference numbers in the drawings. The abrupt transitions of the trailing ends 44 resist pullout of the insert as well as "screw out" from reverse rotation of inserts having helical screw thread-like ridges 20. The wedges increase the resistance to pull out without changing the outer diameter of the insert.

When insert 10 having angular ridges 20 of projections 22 is pushed into a hole formed in a plastic body, for example, ridges 20 acting as screw threads to displace the plastic and force the displaced plastic to press against the root area of the insert. Insert 10 can rotate slightly as it is being inserted. Wedges 40 in the root areas provide surfaces for the plastic to flow into and against; thereby increasing the resistance to tensile as well as rotational forces that otherwise would tend to withdraw the insert from a body in which it is anchored.

Inserts as described herein are particularly suitable for "push-in" type installation methods, but can be used in a variety of other application methods, including but not limited to heat staking, and ultrasonic insertion. Further, direct placement in molded components during the molding process, or subsequent fill of molten material in a pocket including the insert also can suitably anchor inserts as described herein by injecting molten material around the body. Inserts as described herein also may work well when anchored in components of material other than plastics when the material immediately adjacent and surrounding the insert is provided in a molten or liquid state to fill closely around projections 22 and wedges 40, or is soft enough to yield and deform from the ridges 20 being pushed therein.

The most advantageous processes for installing the insert will cause material of the body in which the insert is installed to flow into the root areas between adjacent ridges of projections. With good fill in the root areas from a proper sized hole, the displaced material is reformed against wedges 40 to provide strength against rotation and pullout from the generally axial and generally circumferential faces of the projections 22 and wedges 40. The substantially axial sides of the projections resist rotation of the insert in the receiving component, and the substantially circumferential portions of backs 26 and trailing ends 44 resist pullout of the insert from the receiving component. The length, height, frequency and helical orientation of the projections 22 and wedges 40 can be selected to achieve the desired drivability and resistance to both pullout and rotation of a particular insert in a specific material.

Figure 4:
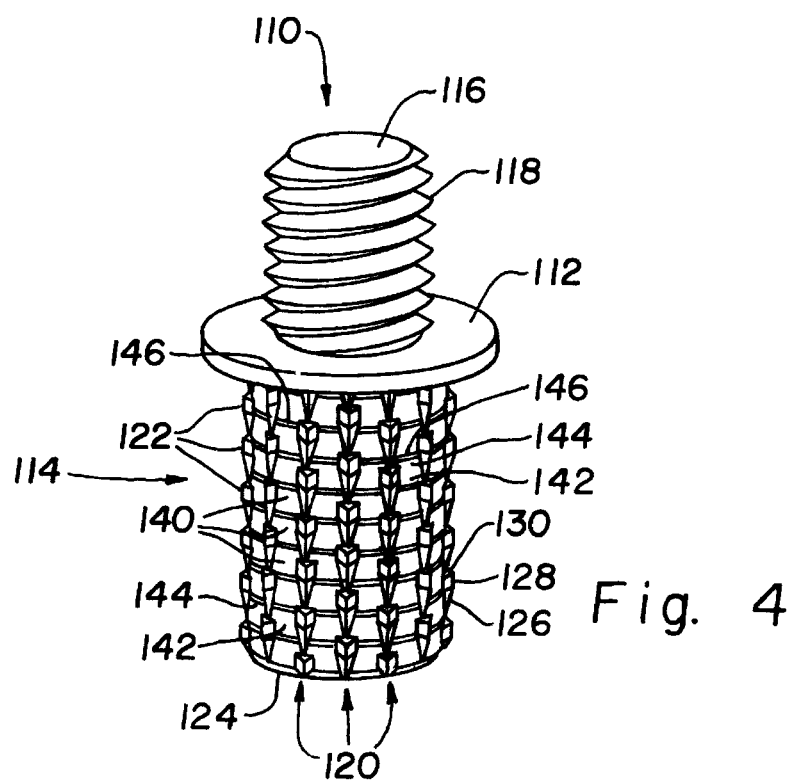
FIG. 4 is a perspective view of a male stud insert.

FIG. 4 shows another embodiment of a threaded insert 110, which is a monolithic body of metal such as steel including a head 112, and an embeddable shank 114. Insert 110 is a male threaded insert, having a stud 116 extending axially from head 112 opposite from shank 114. Stud 116 includes a male thread 118 thereon for engaging a nut or other female threaded component to be held in position by insert 110. The outer surface of shank 114 defines a plurality of ridges 120 each made of a series of spire-like projections 122. Some, but not all projections 122 have been identified with reference numerals in the drawings. Each projection 122 includes a two-sided tip portion 126 that is narrower at the lead end thereof and wider at the trailing end thereof while being also shorter at the lead end and taller at the trailing end. At the trailing end, an enlarged cap 128 is provided, having an exposed back 130. As further shown in the exemplary embodiment, within ridge 120, inwardly from the first projection 122 each tip portion 126 begins immediately adjacent and in contact with the back 130 of the projection 120 immediately in front of thereof toward a distal or lead end 124. Ridges 120 are arranged axially along the length of shank 114, rather than angularly as are ridges 20 of insert 10 described previously.

In the root areas between adjacent ridges 120, the surface of insert 110 is provided with nicking, being formed into a contoured surface of adjacent wedges 140 also inclining from the tips or lead ends 142 thereof to the tails or trailing ends 144 thereof. The trailing ends 144 form abrupt transitions or shoulders 146 to the next adjacent wedge 140. Accordingly, wedges 140 are lower at lead ends 142 and higher at trailing ends 144. In the exemplary embodiment, wedges 140 extend laterally the full distance between adjacent ridges 120. Some, but not all wedges 140 and some, but not all lead ends 142, trailing ends 144 and shoulders 146 have been identified with reference numbers in the drawings.

Insert 110 can be installed as described for insert 10. Since ridges 120 are primarily axially arranged, insert 110 will not rotate significantly during a push-in type installation. However, a proper sized hole in a body of suitable material will re-form as ridges 120 embed in the material and force the material against wedges 140.

The spire thread with root nicking on an embedded insert can provide both rotation and pullout resistance without complex undercuts on knurled formations, as used previously. As a result, the insert can provide the anti-rotation and pullout resistance performance of expensive, machined inserts, typically of brass, but with the cost advantages of a low cost, rolled steel component. The surface form described herein can work well for many types of inserted fasteners, including female inserts functioning as screw and bolt anchors; and male inserts for studs as described previously herein; as well as ball-ended studs designed to snap-fit into other components, or an anchored stud having any other type of end configuration suitable for the purpose. For example, the stud could have a hook, a nail point, an electrical contact or other configuration, whether complex or simple. Other embedded male components, female components and neutral anchored devices also can use spire forms with ring shank nicking as described herein. Further, the insert surfaces disclosed herein can be used for other than straight shanks as well as stepped shanks, and can be provided on all or just a portion of the embeddable length of an insert.

Inserts 10 and 110 as well as others consistent with the teachings hereof can be manufactured efficiently from inexpensive metal, such as steel, altered in a rolling process utilizing dies to form the desired surface characteristics, including the ridges of projections and root nicking between the ridges. Accordingly, the inserts can be manufactured efficiently and inexpensively. Of course, more expensive materials can be used for installations requiring specific metal characteristics. Still other materials can be used and manufacturing processes other than a rolling process also can be used if desired.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An insert, comprising:
    an embeddable body having an external surface;
    a plurality of spaced ridges projecting from and extending along said external surface, each of said ridges including a series of end-to-end projections, each said projection being narrower at one end than at an opposite end, and forming a ramp from said one end to said opposite end, each projection having an exposed blunt back; and
    a plurality of wedges disposed between adjacent ridges of said plurality of ridges, said wedges having lower ends and higher ends, and blunt transitions from a higher end of one wedge to a lower end of an adjacent wedge.

2. The insert of claim 1, each said ridge including a series of triangular projections in end-to-end arrangement.

3. The insert of claim 1, said wedges having lower ends and higher ends, and blunt transitions from a higher end of one wedge to a lower end of an adjacent wedge.

4. The insert of claim 1, including an axial opening in said insert.

5. The insert of claim 1, including a head and a shank, said external surface being an external surface of said shank, and said ridges extending the length of said shank.

6. The insert of claim 5, said ridges arranged axially on said shank.

7. The insert of claim 5, said ridges arranged angularly on said shank and extending a length on said shank without completely encircling said shank.

8. The insert of claim 5, including a stud opposite said shank.

9. A fastener insert, comprising:
    an embeddable fastener body having an external surface;
    a plurality of spaced ridges projecting from and extending along said external surface, adjacent ridges of said plurality of spaced ridges defining inter-ridge spaces therebetween;
    each said ridge including a row of end-to-end projections, each said projection having a narrower and shorter portion and a wider portion and taller portion; and
    a series of wedges arranged in each said inter-ridge space.

10. The fastener insert of claim 9, each said ridge extending axially on said external surface.

11. The fastener insert of claim 9, said ridges arranged angularly on said external surface and extending a length on said external surface without completely encircling said external surface.

12. The fastener insert of claim 9, including an axial opening in said fastener body.

13. The fastener insert of claim 9, including a stud extending from said body.

14. The fastener insert assembly of claim 9, said fastener body including a head and a shank, said external surface being an external surface of said shank, and each said ridge extending a length on said shank without completely encircling said shank.

15. An external surface on a fastener insert that is a monolithic body including a head and a cylindrical shank extending from the head, the shank having a distal end opposite the head, said external surface comprising:
    a plurality of spaced ridges projecting from and extending partly around the shank at a ridge pitch such that individual ridges extend a given length of the shank without fully encircling the shank;
    each said ridge including a row of end-to-end projections varying in width and height; and
    a series of wedges projecting from said shank between pairs of adjacent ridges.

16. The external surface on a fastener insert of claim 15, each said ridge arranged axially on said shank.

17. The external surface on a fastener insert of claim 15, each said ridge arranged angularly on said shank and extending the length of said shank without completely encircling said shank.

18. The external surface on a fastener insert of claim 15, said wedges extending from one ridge to another ridge.

\* \* \* \* \*